(12) United States Patent
Huang et al.

(10) Patent No.: US 9,310,234 B2
(45) Date of Patent: Apr. 12, 2016

(54) FLOW RATE TESTING TO LOCATE TUBE OBSTRUCTION

(71) Applicant: DMAR ENGINEERING, INC., Houston, TX (US)

(72) Inventors: Zhiming Huang, Missouri City, TX (US); Dagang Zhang, Houston, TX (US)

(73) Assignee: DMAR Engineering, Inc., Houston, TX (US)

( * ) Notice: Subject to any disclaimer, the term of this patent is extended or adjusted under 35 U.S.C. 154(b) by 13 days.

(21) Appl. No.: 14/337,222

(22) Filed: Jul. 22, 2014

(65) Prior Publication Data
US 2016/0025532 A1    Jan. 28, 2016

(51) Int. Cl.
*G01F 1/34*    (2006.01)

(52) U.S. Cl.
CPC ........................................ *G01F 1/34* (2013.01)

(58) Field of Classification Search
None
See application file for complete search history.

(56) References Cited

U.S. PATENT DOCUMENTS

| | | | | |
|---|---|---|---|---|
| 5,361,636 A | * | 11/1994 | Farstad | G01M 3/243 73/592 |
| 5,528,944 A | * | 6/1996 | Hoyt | G01M 99/00 73/865.9 |
| 2004/0231408 A1 | * | 11/2004 | Shammai | E21B 49/10 73/152.27 |

* cited by examiner

*Primary Examiner* — Harshad R Patel
(74) *Attorney, Agent, or Firm* — Liaoteng Wang

(57) ABSTRACT

A hydraulic power unit, a flow meter, and a pressure gauge couple to a first end of a tube under testing. The hydraulic power unit provides an inlet pressure to move a testing fluid through the tube. The flow meter measures a flow rate of the testing fluid and the pressure gauge measures the inlet pressure. An accelerometer measures sound and vibration of the tube. A reservoir couple to an outlet of the tub and an inlet of the hydraulic power unit. The reservoir supplies the testing fluid to the hydraulic power unit and collects the testing fluid from the tube. Hoses interconnect the components in a closed loop that reuses the testing fluid. By analyzing the flow rate, it is determined if an obstruction exist in the tube. By analyzing the inlet pressure and the sound and vibration of the tube, a location of the obstruction is determined.

8 Claims, 2 Drawing Sheets

FLOW RATE TESTING TO LOCATE TUBE OBSTRUCTION

FIELD OF PRESENT DISCLOSURE

This present disclosure relates to flow rate testing.

BACKGROUND INFORMATION

Flow rate testing is a common practice for subsea equipment involving long and oftentimes small diameter tubes, such as umbilicals and hydraulic flying leads. The testing is used to confirm the continuity of the tubes, and prove the tubes are able to convey the required volume of fluid within a given time period at a certain inlet pressure. Typically the testing setup includes a hydraulic power unit to provide required pressure, a reservoir tank to collect and supply the fluid continuously, one or more flow rate meters to measure flow rate, one or more pressure gauges to monitor pressure, and hoses to connect all the testing components. During the testing, the inlet pressure is set at a constant pressure, and the corresponding flow rate is measured. When the flow rate is lower than the value expected at a certain inlet pressure, it's an indication that one or more obstructions exist in the tube, which could be due to fluid deposits on the tube wall, or tube cross sectional deformation (e.g., kinked tubes or umbilical buckling). However, testing performed as such can only provide the flow rate corresponding to each inlet pressure, and cannot provide details on the obstruction location when the flow rate is lower than the value expected at a certain inlet pressure. Apparatus and methods have been proposed that can be used to perform the flow rate testing and pinpointing the obstruction location(s) when one or more obstructions exist in the tubes.

DETAILED DESCRIPTION

Figure 1:
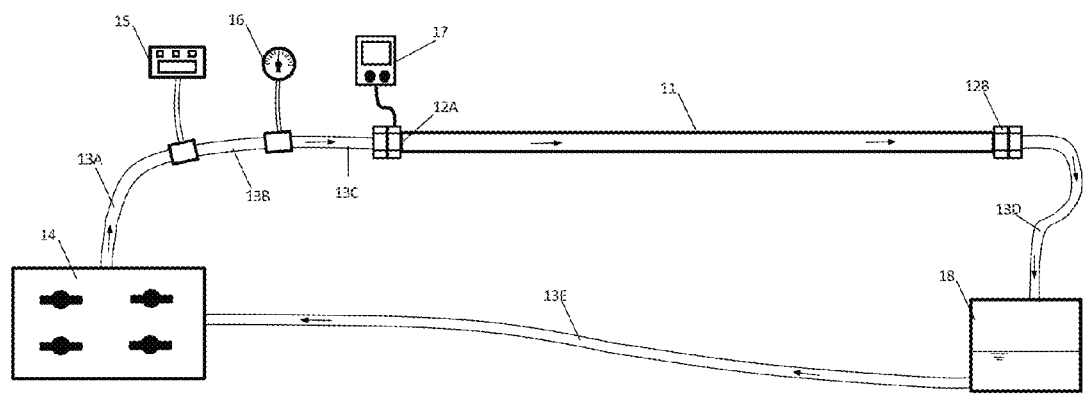
FIG. 1 is a schematic diagram showing an embodiment of the apparatus and methods for flow rate testing.

This document discloses apparatus and methods related to flow rate testing. FIG. 1 shows an implementation of the apparatus and methods for flow rate testing, which includes two connection fittings 12A and 12B that can be attached to the two ends of a testing sample 11, hoses 13 (13A, 13B, 13C, 13D, and 13E as shown in FIG. 1), a hydraulic power unit 14, a flow meter 15, a pressure gauge 16, an accelerometer 17, and a reservoir tank 18, all of which are connected to form a closed loop, which allows the testing fluid to circulate within the hoses 13 and the testing sample 11. The hydraulic power unit 14 draws the testing fluid from the reservoir tank 18 and apply a prescribed pressure to pumps the testing fluid through the testing sample ill, white the flow meter 15 measures the flow rate, the pressure gauge 16 measures the inlet pressure, and accelerometer 17 measures the proper acceleration of the testing sample 11.

Figure 2:
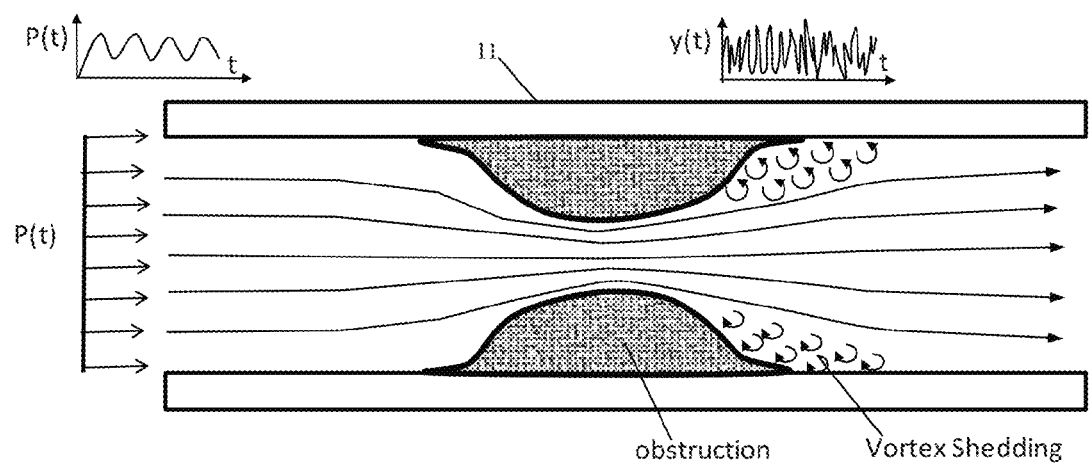
FIG. 2 is a schematic diagram showing an obstruction inside a tube, causing vortex shedding to occur, the strength and frequency of which change in response to changing inlet pressures that pump the fluid to pass through the tube.

FIG. 2 shows a schematic diagram of a testing sample 11, a tube with an obstruction inside the tube. When the testing fluid is pushed through the tube at a certain inlet pressure, vortex will occur after the obstruction, and the vortex shedding strength and frequency will vary when the velocity of the fluid varies. At lower inlet pressure, the fluid velocity is low, and vortex shedding may not be detected by accelerometers. As inlet pressure increases, the fluid velocity increases, and vortex shedding will become detectable by accelerometers, as the vortex shedding will generate sound and cause the tube to vibrate sufficiently so as to be detected by accelerometers.

In some implementations, the obstruction location can be identified as indicated in FIG. 2: (i) the inlet pressure will oscillate continuously over time between a minimum pressure (when vortex shedding is below the threshold of detection by the accelerometers) and a maximum pressure (when vortex shedding is easily detectable by the accelerometers), and the inlet pressure time history P(t) is recorded; (ii) at the same time, the vibration motion time history y(t) of the testing sample is also recorded; (iii) the two time histories are compared, and the phase and/or time differences between these inlet pressure variation signals and the vortex shedding sound and tube vibration signals can be determined; and (iv) the distance of the sound and vibration source from the accelerometer can be calculated based on the phase/time differences and the sound and tube vibration travel speed within the tube wall, and the position of the obstruction along the tube can thus be pinpointed.

During umbilical fabrication, tube buckling is a major defect and threatens to render the umbilical products unusable. By applying the flow rate testing method as disclosed herein, the tube buckling location can be determined where visual inspection for potential defects is impracticable, making it possible for the defects to be identified, removed and corrected.

In some implementations, the hydraulic power unit 14 is configured to provide the inlet pressure according to a prescribed pattern. For example, it can be configured to have constant pressure output for a period of time, or linearly (or nonlinearly) increasing (or decreasing) pressure output for a period of time, or certain periodic pressure output patterns. The pressure gauge 16 can record the pressure time history data. for the entire testing period.

In some implementations, the accelerometer 17 is configured to receive sound and vibrations at the fitting connection 12A, and the sound and vibration time history data can be recorded for the entire testing period. In some other implementations, the accelerometer 17 can be placed in other locations along the testing sample 11, or there can be multiple accelerometers along the testing sample 11 and fitting connections 12.

In some implementations, the pressure gauge 16 and flow meter 15 can be both positioned upstream of the testing sample 11, where the testing fluid gets pumped into the testing sample 11 through the action of the hydraulic power unit 14. In some other implementations, more pressure gauges and flow meters can be added into the testing loop, and can be positioned anywhere in the loop.

In some implementations, the flow rate testing can be carried out as follows: (i) set up and connect all components as shown in FIG. 1; (ii) activate the hydraulic power unit 14 and output constant inlet pressure for a period of time, and record flow rate, pressure, and sound/vibration data; (iii) vary the hydraulic power unit pressure output between a maximum pressure and a minimum pressure periodically, and record flow rate, pressure, and sound/vibration data and (iv) analyze the flow rate data to determine if an obstruction exists, and analyze the sound/vibration data to determine the location(s) of the obstruction(s), Other Embodiments Various other adaptations and combinations of features of the embodiments and implementations disclosed are within the scope of the present disclosure. It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An apparatus for flow rate testing of a testing fluid through a tube having an inlet end and an outlet end, the apparatus comprising:
    a hydraulic power unit providing an inlet pressure to move the testing fluid through the tube, the hydraulic power unit having an inlet and an outlet;
    a plurality of test equipment connected in series with the tube, comprising:
        a flow meter measuring a flow rate of the testing fluid through the tube;
        a pressure gauge measuring the inlet pressure; and
        an accelerometer measuring sound and vibration of the tube, wherein a first of the plurality of test equipment is connected to the outlet of the hydraulic power unit and a last of the plurality of test equipment is connected to the inlet end of the tube;
    a reservoir tank supplying the testing fluid to the hydraulic power unit and collecting the testing fluid from the tube, the reservoir tank having an inlet connected to the outlet end of the tube and an outlet connected to inlet of the hydraulic power unit; and
    hoses interconnecting the hydraulic power unit, the flow meter, the pressure gauge, the tube, and the reservoir tank in a closed loop that reuses the testing fluid.

2. An apparatus according to claim 1, further comprising two connection fittings attached to the inlet and the outlet ends of the tube.

3. An apparatus according to claim 2, wherein the accelerometer is attached to one of the two connection fittings to receive the sound and the vibration of the tube at the connection fitting.

4. An apparatus according to claim 3, wherein a first hose connects the hydraulic power unit to the flowmeter, a second hose connects the flow meter to the pressure gauge, a third hose connects the pressure gauge to a first of the two connection fittings, a fourth hose connects a second of the two connection fittings to the reservoir tank, a fifth hose connects the reservoir tank to the hydraulic power unit, and the accelerometer is attached to the first of the two connection fittings.

5. An apparatus according to claim 3, further comprising a control unit to:
    configure the hydraulic power unit to output the inlet pressure that oscillates between a maximum pressure and a minimum pressure periodically;
    record flow rate data, pressure data, and sound and vibration data;
    analyze the flow rate data to determine if an obstruction exists in the tube; and
    analyze the sound and vibration data to determine the location of the obstruction in the tube.

6. An apparatus according to claim 1, wherein the hydraulic power unit is configured to provide the inlet pressure according to a prescribed pattern.

7. An apparatus according to claim 6, wherein the inlet pressure oscillates between a minimum pressure and a maximum pressure.

8. A method for flow rate testing on a testing sample, comprising:
    connecting a testing sample to a flow rate testing system, which comprises a hydraulic power unit to output an inlet pressure, a flow meter to measure a flow rate, a pressure gauge to measure the inlet pressure, an accelerometer to measure sound and vibration, and a reservoir tank containing a testing fluid, all interconnected by hoses to form a closed loop;
    configuring the hydraulic power unit to output the inlet pressure that oscillates between a maximum pressure and a minimum pressure periodically;
    recording flow rate data, pressure data, and sound and vibration data;
    analyzing the flow rate data to determine if an obstruction exists in the testing sample; and
    analyzing the sound and vibration data to determine the location of the obstruction in the testing sample.

* * * * *